(12) United States Patent
Fournand

(10) Patent No.: US 9,637,643 B2
(45) Date of Patent: *May 2, 2017

(54) METHOD FOR THE PRODUCTION OF AN OPTICAL ARTICLE WITH IMPROVED ANTI-FOULING PROPERTIES

(71) Applicant: ESSILOR INTERNATIONAL (COMPAGNIE GENERALE D'OPTIQUE), Charenton-le-Pont (FR)

(72) Inventor: Gerald Fournand, Dallas, TX (US)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/758,158

(22) PCT Filed: Dec. 24, 2013

(86) PCT No.: PCT/EP2013/077978
§ 371 (c)(1),
(2) Date: Jun. 26, 2015

(87) PCT Pub. No.: WO2014/102271
PCT Pub. Date: Jul. 3, 2014

(65) Prior Publication Data
US 2015/0361279 A1 Dec. 17, 2015

Related U.S. Application Data

(60) Provisional application No. 61/746,819, filed on Dec. 28, 2012.

(51) Int. Cl.
  C09D 5/16 (2006.01)
  G02B 1/04 (2006.01)
  G02B 27/00 (2006.01)
  G02B 1/18 (2015.01)

(52) U.S. Cl.
  CPC ............. C09D 5/16 (2013.01); G02B 1/043 (2013.01); G02B 1/18 (2015.01); G02B 27/0006 (2013.01); Y10T 428/31663 (2015.04)

(58) Field of Classification Search
  None
  See application file for complete search history.

(56) References Cited

U.S. PATENT DOCUMENTS

| | | | | |
|---|---|---|---|---|
| 6,183,872 B1 * | 2/2001 | Tanaka | ............ | C08G 65/007 106/287.13 |
| 6,991,827 B2 * | 1/2006 | Biver | ............ | B29D 11/00865 118/423 |
| 2004/0253369 A1 * | 12/2004 | Jallouli | ............ | B05D 3/141 427/162 |
| 2005/0115923 A1 * | 6/2005 | Lacan | ............ | C03C 17/3417 216/26 |
| 2005/0168685 A1 * | 8/2005 | Katagiri | ............ | C09D 4/00 351/159.01 |
| 2006/0246278 A1 * | 11/2006 | Lacan | ............ | B24B 9/144 428/336 |
| 2007/0104891 A1 * | 5/2007 | Fournand | ............ | C09D 5/1662 427/561 |
| 2007/0141358 A1 * | 6/2007 | Jallouli | ............ | B24B 9/146 428/426 |
| 2007/0183056 A1 | 8/2007 | Conte et al. | | |
| 2008/0117382 A1 * | 5/2008 | Lacan | ............ | B24B 1/00 351/159.57 |
| 2008/0271844 A1 * | 11/2008 | Lacan | ............ | C03C 17/00 156/278 |
| 2009/0011255 A1 | 1/2009 | Komai et al. | | |
| 2009/0232978 A1 | 9/2009 | Suzuki et al. | | |
| 2010/0053547 A1 * | 3/2010 | Baude | ............ | G02B 27/0006 351/159.01 |
| 2010/0279089 A1 * | 11/2010 | Naito | ............ | C09D 175/06 428/212 |
| 2011/0223418 A1 * | 9/2011 | Habassi | ............ | B29D 11/00432 428/354 |

* cited by examiner

FOREIGN PATENT DOCUMENTS

JP        2008073883        4/2008

Primary Examiner — Robert S Loewe
(74) Attorney, Agent, or Firm — Norton Rose Fulbright US LLP

(57) ABSTRACT

Method for the manufacture of an optical article comprising the following steps: —providing a substrate having two main faces and bearing —OH functions on at least one of its faces, —successively exposing in this order one face of the substrate bearing —OH functions to at least 3 distinct materials named M1, M2, M3 and optionally material M4 in a vacuum chamber under conditions resulting in the deposit of those materials on the surface of the substrate, and wherein: —M1 is a substituted silane comprising at least one function X1 directly bonded to a Si atom of the substituted silane, wherein the Si—X1 group is capable of forming a covalent bond with a OH group of the substrate, X1 being preferably a hydrolysable group (such a —$NH_2$ group) or a —OH group directly bonded to the silicon atom and comprising at least one fluorine containing group, —M2 is a substituted silane of number average molecular weight inferior or equal to 900 g/mol comprising at least one function X2 directly bonded to a silicon atom of said substituted silane wherein the Si—X2 group is capable of forming a covalent bond with a —OH group of the substrate and/or a covalent bond with M1, X2 being preferably a hydrolysable group (such a —$NH_2$ group) or a OH group and at least one hydrophobic or oleophobic group, or at least one hydrophilic group, —Wherein M1 has a weight average molecular weight higher than M2 and the difference between M1 and M2 weight average molecular weights is equal to or higher than 600 g/mol, preferably equal to or higher than 900 g/mol. —M3 is a metal fluoride, —Optional M4 is a non fluorinated metal oxide or metal hydroxide.

22 Claims, No Drawings

METHOD FOR THE PRODUCTION OF AN OPTICAL ARTICLE WITH IMPROVED ANTI-FOULING PROPERTIES

CROSS-REFERENCE TO RELATED APPLICATIONS

This application is a national phase application under 35 U.S.C. §371 of International Application No. PCT/EP2013/077978 filed 24 Dec. 2013, which claims priority to U.S. Provisional Application No. 61/746,819 filed 28 Dec. 2012. The entire contents of each of the above-referenced disclosures is specifically incorporated by reference herein without disclaimer.

1. Field of the Invention

The invention is directed to a method for the manufacture of an optical article, such as ophthalmic lenses, with improved anti-fouling properties, and presenting satisfying edging capability. It is also directed to optical articles, especially lenses, obtained by this method.

The invention is concerned more particularly with the production of optical articles comprising, as an outermost layer, an anti-fouling topcoat such as a hydrophobic and/or oleophobic surface coating.

The method of the invention comprises providing a substrate having two main faces and successively exposing one face of the substrate to several distinct materials in a chamber under conditions resulting in the deposit of those materials on the surface of the substrate, the first of those materials being selected from silanes of high molecular weight comprising at least one hydrolysable group (such as a —$NH_2$ group) or a —OH group directly bonded to the silicon and comprising at least one fluorine containing group, the second of those materials being selected from silanes of low molecular weight comprising at least one hydrolysable group (such as a —$NH_2$ group) or a —OH group directly bonded to the silicon and comprising at least one hydrophobic and/or oleophobic group.

An ophthalmic lens results from a succession of molding and/or surfacing/smoothing operations determining the geometry of both convex and concave optical surfaces of said lens, followed by appropriate surface treatments.

The last finishing step of an ophthalmic lens is the edging operation consisting in machining the edge or the periphery of the lens so as to shape it according to the required dimensions to fit the lens into the eyeglass frame wherein it is to be arranged.

Edging is conventionally performed on a grinding machine comprising diamond abrasive wheels that perform the machining step as defined hereinabove.

The lens is held, during such an operation, by axially acting blocking members.

The relative motion of the lens with respect to the grinding wheel is monitored, generally digitally, so as to provide the desired shape.

As it appears, it is absolutely imperative that the lens be firmly maintained during such a movement. To this end, before the edging operation, a lens-blocking step is performed, i.e. a holding means or chuck is positioned on the convex surface of the lens.

A holding pad, preferably a two-sided adhesive, is arranged between the chuck and the convex surface of the lens.

The so-equipped lens is positioned on one of the above-mentioned axial blocking members, the second axial blocking member then clamping the lens on the concave surface thereof by means of an abutment, generally made of an elastomer.

Upon the machining step, a tangential torque stress is generated on the lens, which may result in a rotation of the lens relative to the chuck if the lens holding means is not sufficiently efficient.

The good holding of the lens mainly depends on the good adhesion at the interface of holding pad/convex surface of the lens.

The temporary use of an adhesive layer on the lens in order to permit its machining or grinding in a satisfactory manner is recommended. However, even if it is temporary, such an adhesion-promoting layer can induce a modification of the properties of the underlying layers.

2. Description of Related Art

It is a common practice in the art to coat at least one main surface of a lens substrate, such as an ophthalmic lens or lens blank, with several coatings which impart to the finished lens additional or improved optical or mechanical properties. These coatings are usually designated as functional coatings.

Thus, it is a usual practice to coat at least one main surface of a lens substrate, typically made of an organic glass material, with successively, starting from the surface of the lens substrate, an impact-resistant coating (impact resistant primer), an abrasion- and/or scratch-resistant coating (hard coat) and an anti-reflection coating.

The last generation ophthalmic lenses most often also comprise an external layer of anti-fouling material generally deposited on the anti-reflection coating, in particular an anti-reflection coating made of an inorganic material, so as to reduce their strong tendency to staining, for example towards fatty deposits. Such an anti-fouling topcoat is generally a hydrophobic and/or oleophobic coating, which reduces the surface energy of the lens so as to avoid the adhesion of fatty stains, which are thus easier to remove. The hydrophobic topcoat constitutes, in the finished optical article, the outermost coating.

Such topcoats are known in the art and are usually made of fluorosilanes or fluorosilazanes i.e., silicones or silazanes bearing fluorine-containing groups. Examples of classical materials for topcoats are OPTOOL DSX™, which is a fluorine-based resin comprising perfluoropolyether moieties, commercialized by Daikin Industries, KY130™ from Shin-Etsu Chemical and KP 801M™, also commercialized by Shin-Etsu Chemical and AES4™ commercialized by Daikin Industries. These coatings impart to the lens a contact angle with water of at least 100°.

The most performant top coats, such as Optool DSX™, AES4™ or KY130™, especially Optool DSX™ and AES4™ have such an efficiency that their surface energy is considerably decreased. As a consequence, the adhesion at the pad/convex surface interface can be thereby altered, making edging operations difficult, in particular for polycarbonate lenses, the edging of which generates much more important stresses in comparison with other materials.

High slipperiness of the lens surface may result in substantially shifting the center of the lens from the lens chuck in which the center of the lens is fixed, thus shifting the optical and horizontal/vertical axes of the lens from the real center thereof. This phenomenon possibly leads to alteration of vision correcting effects and/or impossibility to insert the lens into the desired frame. The consequence of a badly performed edging operation is thus the pure and simple loss of the lens.

To solve these problems, it has been found advantageous to deposit on the outermost layer of the lens a temporary film.

An effective solution is to deposit on the outermost layer of the lens a temporary coating imparting a surface energy of at least 15 mJ/m$^2$, in particular a MgF$_2$ temporary layer, such as disclosed by the applicant in French Patent No 2824821. This solution is applicable whatever the deposit process of the anti-fouling topcoat. However, lenses having their external layer coated with a temporary MgF$_2$ layer may sometimes not be edged for 48 hours following deposit of such a temporary layer.

Such a method was further improved in French Patent No 2856056 in the name of the present applicant, which describes ophthalmic lenses coated with said MgF$_2$ temporary layer, on which a layer of at least one non fluorinated metallic oxide and/or at least one non fluorinated metallic hydroxide has been deposited or created. The additional layers enable to perform the edging operation very quickly after the various layers have been deposited on the lens.

Such layers of MgF$_2$ and MgO are temporary and they are normally removed, by wiping off or rinsing for example, after the lens has been machined and is ready for use.

However, when temporary overlayers of MgF$_2$ and optionally MgO are deposited on the hydrophobic and/or oleophobic coating, it has been noted that such a hydrophobic and/or oleophobic coating, also named topcoat, presents, after the temporary layer has been removed, degraded performances, as compared to a topcoat which has not been submitted to the deposit of a temporary MgF$_2$ and optionally MgO coating.

Specifically, it has been noted that the hydrophobicity and/or oleophoby of the lens topcoat layer was significantly degraded after removal of the MgF$_2$ and optional MgO coating, as compared to the properties of the original lens including the same topcoat layer.

A solution might consist in increasing the thickness of the topcoat layer. However, this solution is extremely costly, the topcoat materials being high molecular weight sophisticated molecules.

Document US20090257022 describes a water and oil repellent layer provided in contact with a multilayered antireflection film, the water and oil repellent layer being made by using, as raw materials two different fluorine-substituted alkyl group-containing organosilicon compounds.

The first and the second fluorine substituted alkyl group containing organosilicon compounds each preferably have an average molecular weight of 1000 to 10000.

Typically AES4™ and KY130™ (or KY164) are deposited successively by evaporation or mixed together in a fluorinated solvent and deposited at the surface of a lens by dip coating.

The obtained lens is capable of retaining a sufficient water and oil repellency over an extended period and having sufficient edge processability using a silicon adhesive tape or a protection film for edging process.

Document US2010/0053547 describes an optical article with an anti-smudge coating on its main surface and a temporary layer applied thereof.

The anti-smudge coating is the result of the hardening of a polymerizable composition comprising 55 to 80% by weight of a perfluorinated compound having only one end comprising a silanol group or a precursor thereof, typically Optool DSX™, and 45 to 20% by weight of a component selected from linear perfluorinated compounds having both ends of its chain comprising at least one silanol group or silanol precursor, typically KY130™.

The temporary layer is a MgF$_2$ layer and a MgO layer deposited thereon.

Practically, a mixture of ⅔ Optool DSX™ and ⅓ KY130™ is deposited on the substrate by evaporation and a MgF$_2$ layer, followed by a MgO layer is deposited thereon.

Once the MgF$_2$/MgO layer is removed, the anti-smudge coating exhibits a water contact angle higher than that of coatings formed either from Optool DSX™ alone or of KY130™ alone.

The superposition of distinct fluorine containing silane materials is known from the prior art.

Document WO2007/071700 discloses a method for improving the edging of an article by providing a temporary layer of an organic material. A layer of a topcoat including a silane with at least one fluorine containing group is deposited and then a temporary layer of a fluorinated compound of low molecular weight is deposited.

Document US2007/0172622 discloses an ophthalmic glass with a special layer structure comprising a layer of a silane with at least one fluorine containing group with more than 20 carbon atoms and a transparent removable protective layer applied thereon which comprises a silane with at least one fluorine containing group with 20 carbon atoms or less. The second layer provides an adjustment of the surface energy of the glass, in a temporary manner to a value lower than 15 mJ/m$^2$.

Document U.S. Pat. No. 7,449,233 discloses substrates with a first hydrophobic layer having a first contact angle and a second hydrophobic layer having a second contact angle, the first hydrophobic layer being between the second hydrophobic layer and the substrate, the first contact angle being greater than the second contact angle. The first hydrophobic layer is based on a perfluoropolyether silicon compound. The second hydrophobic layer can be based on a perfluoropolyether silicon compound. The second hydrophobic layer is temporary and can be easily removed after handling of the coated substrate is finished, or at least some processing of the coated substrate is finished, using water or alcohol or simply wiping the substrate off, after which the bonded or first hydrophobic layer remains bonded on the substrate.

In the method of the invention, the deposition of the second silane material is made before the application of a removable layer based on a metal fluoride and optionally a non fluorinated metal oxide or metal hydroxide. Actually, it differs from the teaching of the three latest documents in that the second silane deposit modifies, in a permanent manner, the properties of the optical article including the first silane deposit, so that when the MgF$_2$/(optionally MgO) temporary layer is removed, the properties of the first deposit have not been degraded by the temporary application of this MgF$_2$/(optionalMgO) layer.

SUMMARY OF THE INVENTION

The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. As a result, a method, or a step in a method, that "comprises," "has," "contains," or "includes" one or more steps or elements possesses those one or more steps or elements, but is not limited to possessing only those one or more steps or elements. even if this latter case is preferred in the implementation of the invention.

The optical articles used in the process of the invention are preferably ophthalmic lens substrates. The term "substrate" means an organic or inorganic glass substrate, either treated or not, depending upon whether it comprises one or more coatings of various natures or whether it is naked. Herein, the term "lens" means the product resulting from the application of successive treatments: coating or deposit, edging etc. . . .

It has been an aim of the invention to provide a method for producing an optical article with improved properties.

More specifically, it has been an aim of the invention to provide a method for producing an optical article with an aptitude to be submitted to machining and/or grinding, particularly an article including a temporary layer providing a high surface energy, preferably a surface energy superior or equal to 15 mJ/m$^2$.

Specifically, it has been an aim of the invention to provide a method for producing an optical article including a hydrophobic and/or oleophobic topcoat, and to obtain satisfying superior hydrophobicity and/or oleophoby after the optical article has been machined and/or grinded and the temporary layer has been removed.

Such aims have been reached thanks to the method that will be disclosed here-under.

A first object of the invention is a method for the manufacture of an optical article comprising the following steps:
  providing a substrate having two main faces and bearing —OH functions on at least one of its faces,
  successively exposing in this order one face of the substrate bearing —OH functions to at least 3 distinct materials named M1, M2, M3 and optionally materials M4 in a vacuum chamber under conditions resulting in the deposit of those materials on the surface of the substrate, and wherein:
  M1 is a substituted silane comprising
  at least one function X1 directly bonded to a Si atom of the substituted silane wherein the Si—X1 group is capable of forming a covalent bond with a —OH group of the substrate, and/or a covalent bond with M2,
  at least one fluorine containing group,
  M2 is a substituted silane having a number average molecular weight inferior or equal to 900 g/mol comprising:
  at least one function X2 directly bonded to a silicon atom of said substituted silane, wherein the Si—X2 group is capable of forming a covalent bond with a —OH group of the substrate and/or a covalent bond with M1
  at least one hydrophobic or oleophobic group, or at least one hydrophilic group,
  Wherein M1 has a weight average molecular weight higher than M2 and the difference between M1 and M2 weight average molecular weights is equal to or higher than 600 g/mol, preferably equal to or higher than 900 g/mol.
  M3 is a metal fluoride,
Optionally, another material M4 can be deposited above the M3 material.
It can be an organic material such as disclosed in EP1467955 or an inorganic material, Preferably, the other material is a non fluorinated metal oxide such as MgO or metal hydroxide.

According to the invention, the method of manufacture of the optical device comprises the successive application of at least three surface coatings, the term "the deposit of those materials on the surface of the substrate" means that each material is deposited onto the outermost coating of the substrate which is resulting from the prior deposition step.

By substrate is meant, in the context of the invention, a material comprising two main faces apt to be submitted to the deposit of materials under conditions selected from reduced pressure, elevated temperature, irradiation and power. Substrates include materials with porous and non-porous surfaces. It includes materials such as glasses, ceramics, porcelains, fiberglass, metals, and organic materials including thermosets such as polycarbonate, and thermoplastics, and ceramic tile. Other organic materials which can be used as substrates in the method of the invention include polystyrene and its mixed polymers, polyolefins, in particular polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

The invention is more specifically directed to a method for the production of glasses and especially of lenses, such as ophthalmic glasses or eyewear lenses. The substrate preferably is of a transparent material comprising an anti reflective optical layer. However it is also suitable for application to the production of microscope slides, decorative glass pieces, plastic sheets, mirror glass, ceramic or marble tile, glasses for doors and windows, screens (television, computer), mirrors, prisms, watch glasses, lenses of optical devices such as binocular lenses, microscope lenses, telescope lenses, camera lenses, video lenses.

The preferred substrate for lens or ophthalmic glass preferably used in the method of the invention may be a treated or untreated synthetic glass formed of, for example, of polythiourethane, polymethylmethacrylate (PMMA), polycarbonate, polyacrylate or polydiethylene glycol bisallyl carbonate, or a treated or untreated mineral glass.

Such a substrate usually includes a hard layer and/or a conventional antireflection layer and comprises a multiple layer structure. Such hard layers and anti-reflection layers are usually applied directly to the surface of the untreated ophthalmic glass or on a primer impact resistant layer already formed on the substrate.

In this case, the coating with hydrophobic and oleophobic properties, also known as top coat, and consisting in at least one layer of M1 material, is advantageously not applied directly to the surface of the naked substrate but to the hard layer or the antireflection layer applied to the ophthalmic glass. Such single or multilayer hard layer coatings and antireflection coatings are well known from the persons skilled in the art and it is well known from the prior art to suitably select appropriate materials and layer thicknesses of those materials. Antireflection coatings can for example include metal oxides such as silicon oxide, titanium oxide, aluminium oxide, zirconium oxide, and combinations thereof. The thickness of the antireflection coating usually is from about 0.1 nm to about 1,000 nm.

The substrate that is submitted to the method of the invention comprises —OH groups at its surface.

If OH groups are not naturally present at the surface of the substrate, they can be created by appropriate treatments known by the man skilled in the art such as corona or plasma treatment.

The method of the invention involves successively exposing the substrate to specific materials in a chamber or closed environment under conditions resulting in the deposit of those materials.

Conditions implying the formation of a layer include at least one of reduced pressure, elevated temperature, irradiation, and power.

The reduced pressure, elevated temperatures, irradiation, and/or power imposed induce vaporization or sublimation of the materials into the chamber atmosphere and subsequent self assembly and/or self-polymerization on the substrate surface. Advantageously, the deposit is made in a uniform fashion on the substrate.

Preferably, reduced pressure and/or elevated temperatures are employed. Even more preferably, elevated temperature is employed.

General examples of techniques that can be used in the method of the invention for forming layers of materials include vapour deposition.

Preferred methods are physical vapour deposition, preferably evaporation under vacuum.

The deposit of material M3 and optionally material M4. are temporary and are conceived to provide the coated substrate with improved adhesion to holding means during edging operations. Such improved adhesion results from the M3 or M3/M4 layer's surface energy which is preferably superior or equal to 15 mJ/m$^2$.

After edging has been performed, the M3 or M3/M4 temporary layer is removed, in conformity with the teachings of the prior art, and the topcoat resulting from the deposit of the M1 and M2 materials is the final uppermost layer of the optical article.

Without being linked to a particular theory, it is possible that the method of the invention advantageously permits partial anchoring of the M2 molecule to the M1 molecules and/or to the substrate's surface.

By anchoring is meant that a covalent bond is formed between the M1 material and part of the M2 material and possibly between the substrate and part of the M2 material.

The inventors have compared the hydrophobic and/or oleophobic properties of the optical articles of the invention with those of articles resulting from a prior art method differing only in that the step of deposit of the M2 material is omitted. Surprisingly, they have observed that the articles resulting from the method of the invention have superior hydrophobic and/or oleophobic properties as compared to articles resulting from the prior art method. Such properties of articles obtained by the method of the invention are comparable to those of topcoats which have not been submitted to the M3 or M3/M4 treatment.

The method according to the invention comprises exposing one face of the substrate to a silane M1 in a chamber under conditions resulting in the deposit of this material.

By substituted silane is meant a molecule comprising a Si atom comprising at least one function bonded to the silicon atom capable of forming a covalent bond with a —OH group of a substrate.

According to the invention, M1 is preferably a substituted silane comprising at least one hydrolysable group (such as a —NH$_2$ group) or a —OH group directly bonded to the silicon atom.

Suitable hydrolyzable groups are well known from persons skilled in the art. Examples of X1 and X2 hydrolyzable groups bonded to a silicon atom are halogen atoms, such as chlorine, —NH-alkyl groups, dialkylamino groups preferably $C_1$-$C_{22}$ N-alkyl groups such as —N(CH$_3$)$_2$ or —N(C$_2$H$_5$)$_2$, alkoxy groups, preferably $C_1$-$C_{22}$ alkoxy groups like —OCH$_3$ or —OC$_2$H$_5$, acyloxy groups, preferably $C_1$-$C_{22}$ acyloxy groups like —OCOCH$_3$ or —OCOC$_2$H$_5$, or isocyanate groups, preferably a —O—N=C(C$_1$-C$_{22}$alkyl)$_2$, like —O—N=C(CH$_3$)$_2$. Preferably, the hydrolyzable group is an alkoxy group, particularly a group selected from —OCH$_3$ or —OC$_2$H$_5$. According to another favourite variant, it is also possible to use a silane which carries at least one —OH group or at least one —NH$_2$ group.

Advantageously, M1 comprises at least one substituted silyl group —Si(R)$_3$, wherein R represents a hydrolysable group or an —OH group or a —NH$_2$ group.

Preferably, M1 comprises at least one substituted silyl group —Si(R)$_3$, wherein R represents a group selected from —OCH$_3$, —OC$_2$H$_5$, —OH and —NH$_2$.

Such a substituted silane M1, which is based on a silicon atom with at least one hydrolyzable group or hydroxyl, when used in the method of the invention, produces a durable chemical bond between the silicium atom of the silane M1 and the surface of the lens or ophthalmic glass or the surface of the hard layer or the antireflection layer of the lens or ophthalmic glass through hydroxyl groups on the surface thereof.

M1 is a substituted silane and comprises at least one hydrolysable group (such as a —NH$_2$ group) or —OH group directly bonded to the silicon atom. It can comprise one, two, three, four, five or more silicon atoms to which hydrolysable groups (such as a —NH$_2$ group) or —OH groups are directly bonded. Preferably M1 comprises one or two silicon atoms to which at least one hydrolysable group or —OH group are bonded.

According to the invention, M1 is a substituted silane comprising at least one fluorine-containing group.

The fluorine containing group results from the assembly of divalent fluoroalkyl groups, fluoroalkenyl groups, poly (fluoro alkyl ether) groups, alkyl groups, alkenyl groups. This assembly can also include ether bridges (—O—) and amino bridges (—NH—, —N=). When M1 comprises only one substituted silyl group, at least one of the groups of which the assembly is composed is monovalent and at least one of the groups is connected to the silicon atom.

By divalent fluoroalkyl group is meant an alkane di-yl group, linear, branched or cyclic, comprising at least one fluorine atom in replacement of a hydrogen atom. Preferably, the fluoroalkyl group comprises 50% or more of fluorine atoms in replacement of hydrogen atoms, even more preferably 70% or more, and even more preferably 90% or more. According to a favourite variant, the divalent fluoro alkyl group is a perfluorinated alkyl group. For example, the fluorine containing group can comprise unit groups such as —CHF—, —CHF—CHF—, —CH$_2$—CH(CF$_2$)$_2$—, —CF$_2$—CH(CF$_2$)$_2$—, —C$_2$—, —CF$_2$—CF$_2$—, —CF$_2$—CF$_2$—CF$_2$—, —CF$_2$—CF(CF$_2$)$_2$—, —(CHF)$_n$—, —(CF$_2$)$_n$—, with n=1, 2, 3, 4, . . . .

By divalent fluoroalkenyl group is meant an alkene di-yl group, linear, branched or cyclic, comprising at least one fluorine atom in replacement of a hydrogen atom. Preferably, the fluoroalkenyl group comprises 50% or more of fluorine atoms in replacement of hydrogen atoms, even more preferably 70% or more, and even more preferably 90% or more. According to a favourite variant, the divalent fluoro alkyl group is a perfluorinated alkenyl group.

By poly(fluoro alkyl ether) group is meant a group resulting from the polymerization of alkoxy and fluoroalkoxy units. Preferably, it results from the condensation of fluoroalkoxy units. Examples of such groups can be —(CHF—CHF—O—)n-, —(CH$_2$—CF$_2$—O—)n-, —(CF$_2$—CF$_2$—O—)n-, —(CF$_2$—CF$_2$—CF$_2$—O—)n-, —(CF$_2$—CH(CF$_3$)—O—)n-, with n=1, 2, 3, 4, . . . and any similar compound. Such groups can also include polyalkoxy units like —(CH$_2$—CH$_2$—O—)m-, —(CH$_2$—CH$_2$—

CH$_2$—O—)m- —(CH$_2$—CH(CH$_3$)$_2$—O—)m- units, with m=1, 2, 3, 4 . . . or similar units. Preferably, the poly(fluoro alkyl ether) group comprises 50% or more of fluorine atoms in replacement of hydrogen atoms, even more preferably 70% or more, and even more preferably 90% or more.

According to a favourite variant, the divalent poly(fluoro alkyl ether) group is a poly(perfluorinated alkyl ether) group.

The alkyl and alkenyl groups can be linear, branched or cyclic.

Preferably, the chain length of the fluorine-containing group of M1 is such that the number average molecular weight of M1 is superior or equal to 2000 g/mol, preferably superior or equal to 3000 g/mol, and more preferably from 3000 g/mol to 6000 g/mol.

Advantageously, it is superior or equal to 4000 g/mol, and better from 4000 g/mol to 5000 g/mol.

Preferably, it is inferior or equal to $1 \cdot 10^5$ g/mol, more preferably, it is inferior or equal to $1 \cdot 10^4$ g/mol.

Preferably, the fluorine-containing group of M1 is such that fluorine atoms represent at least 50% by weight of the total molecular weight of M1, even more preferably at least 60% by weight of the total molecular weight of M1.

In one embodiment, the manufacturing methods of M1 are such that they are a mixture of molecules with different numbers of substituted silyl groups per molecule and fluorine containing groups of different nature and chain lengths. The evaluation of the chain lengths, the fluorine content, the molecular weight, and the number of silane functions must be understood as being average values.

Advantageously M1 is a mixture of molecules of number average molecular weight comprised between 3000 g/mol and 6000 g/mol, even more advantageously between 4000 g/mol and 5000 g/mol.

The method according to the invention further comprises exposing the face of the substrate resulting from the prior exposition to M1 to a second substituted silane M2 in a chamber under conditions resulting in the deposit of this material.

According to the invention, M2 is a substituted silane of number average molecular weight inferior or equal to 900 g/mol comprising at least one hydrolysable group (such as a —NH$_2$ group) or at least one OH group bonded to the silicon atom and at least one hydrophobic or oleophobic group.

The silane groups of which M2 is composed are selected from the same groups as those that can be used to build the M1 material and have been above described.

Preferably, M2 comprises at least one substituted silyl group —Si(R)$_3$, wherein R represents a hydrolysable group such as a —NH$_2$ group or an —OH group.

Preferably, M2 comprises at least one substituted silyl group —Si(R)$_3$, wherein R represents a group selected from —OCH$_3$, —OC$_2$H$_5$, —OH and —NH$_2$.

Advantageously, M2 comprises one and one only substituted silyl group —Si(R)$_3$, wherein R represents a hydrolysable group or an —OH group or a —NH$_2$ group.

The hydrophobic or oleophobic or hydroxy group which is the other part of the M2 molecule can be defined as resulting from the assembly of divalent fluoroalkyl groups, fluoroalkenyl groups, poly(fluoro alkyl ether) groups, alkyl groups, alkenyl groups.

This assembly can also include ether bridges (—O—) and amino bridges (—NH—, —N=). When M2 comprises only one substituted silyl group, at least one of the groups of which the assembly is composed is monovalent and at least one of the groups is connected to the silicon atom.

The number average molecular weight of M2 is inferior or equal to 900 g/mol, preferably inferior or equal to 800 g/mol, even more preferably inferior or equal to 700 g/mol and advantageously inferior to 600 g/mol.

Examples of compounds M1 and M2 are known from the literature, as well as their manufacturing methods.

Such compounds have been widely disclosed in the previous art, for example in U.S. Pat. No. 4,410,563, EP 0203730, EP 749021, EP 844265 and EP 933377, U.S. Pat. No. 6,183,872, WO2006/107083.

Among fluorosilanes there may be cited the compounds of the following formula:

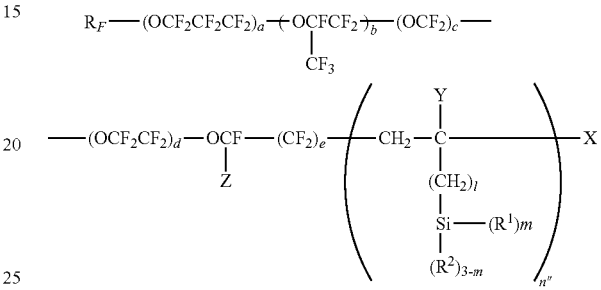

wherein R$_F$ represents a perfluoroalkyl group, Z represents a fluorine atom or a trifluoromethyl group, a, b, c, d and e each independently represent 0 or an integer equal to or higher than 1 provided that a+b+c+d+e is not less than 1, and the order of the repeating units parenthesized by subscripts a, b, c, d and e occurring in the above formula is not limited to that shown; Y represents a hydrogen atom or an alkyl group containing 1 to 4 carbon atoms; X represents a hydrogen, bromine or iodine atom; R$^1$ represents a hydroxyl group, a —NH$_2$ group, or a hydrolyzable substituent group; R$^2$ represents a hydrogen atom or a monovalent hydrocarbon group; l represents 0, 1 or 2; m represents 1, 2 or 3; and n" represents an integer equal to or higher than 1, preferably equal to or higher than 2.

Such kinds of compounds are particularly preferred as compound M1.

Other preferred compounds are those disclosed in U.S. Pat. No. 6,277,485. The fluorinated silanes disclosed in this document respond to the following formula:

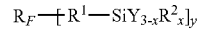

wherein R$_F$ is a monovalent or divalent polyfluoro polyether group; R$^1$ is a divalent alkylene group, arylene group, or combinations thereof, optionally containing one or more heteroatoms or functional groups and optionally substituted with halide atoms, and preferably containing 2 to 16 carbon atoms; R$^2$ is a lower alkyl group (i.e., a C$_1$-C$_4$ alkyl group); Y is a halide atom, a lower alkoxy group (i.e., a C$_1$-C$_4$ alkoxy group, preferably, a methoxy or ethoxy group), or a lower acyloxy group (i.e., —OC(O)R$^3$ wherein R$^3$ is a C$_1$-C$_4$ alkyl group); x is 0 or 1; and y is 1 (R$_F$ is monovalent) or 2 (R$_F$ is divalent). Suitable compounds typically have a molecular weight (number average) of at least about 1000 g/mol. Preferably, Y is a lower alkoxy group and R$_F$ is a perfluoro polyether group.

Other preferred compounds are disclosed in document JP 2005 187936 describing fluorinated compounds of silane suitable for forming anti-smudge coatings and particularly compounds given by the formula:

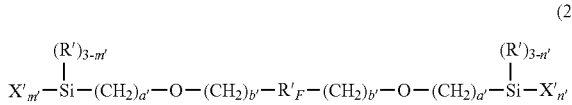

(2)

wherein

R'F is a linear chain divalent perfluoropolyether radical, R' is an alkyl radical in C1-C4 or a phenyl radical, X' is a hydrolysable group, a' is an integer from 0 to 2, b' is an integer from 1 to 5, and m' and n' are integers equal to 2 or 3.

A fluorosilane compound given by the formula (2) above is marketed by SHIN-ETSU CHEMICAL CO, Ltd with the name KY-130™.

Fluorosilane compounds given by the formula (2) and methods for preparing them are also described in the patent application EP 1300433.

Other preferred compositions for forming the hydrophobic and/or oleophobic surface coating are those containing an organosilicone compound represented by General Formula (A) and/or General Formula (B) and (C):

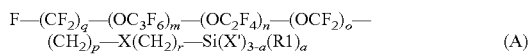

(A)

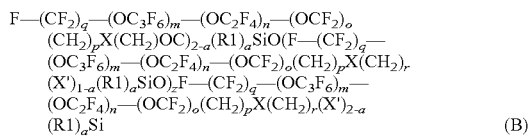

(B)

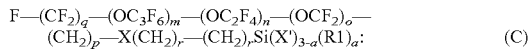

(C)

wherein q is an integer from 1 to 3; m, n, and o are independently integers from 0 to 200; p is 1 or 2; X is O or a bivalent organic group; r is an integer from 2 to 20; t is an integer from 1 to 10, R1 is a C1-22 linear or branched hydrocarbon group; a is an integer from 0 to 2; X' is a hydrolysable group as has been above defined or an —OH group or a —NH$_2$ group; and z is an integer from 0 to 10 when a is 0 or 1.

Such compounds as have been disclosed above by their chemical formulas can be used as the M1 material in the method of the invention.

A particularly preferred material is a material comprising a component responding to formula C wherein X' is an alkylamino and especially the product YY described in example 4 of WO2011/060047, described hereafter as HDTC.

Such compounds as have been disclosed above by their chemical formulas can be used as the M2 material in the method of the invention, provided that their molecular weight is inferior or equal to 900 g/mol.

Additionally, the M2 material can be selected among non fluorinated or fluorinated silanes like those responding to the formulae:

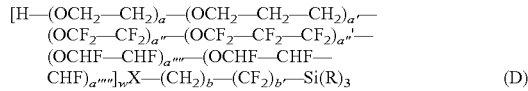

(D)

Wherein a, a', a", a''', a'''', a''''' are integers from 0 to 2, a+a'+a"+a'''+a''''+a''''' is at least one, X is O or N or NH, b and b' are integers from 0 to 10 and b+b' cannot be inferior to 1, R is a hydrolysable group such as has been above defined, or is OH or NH$_2$, the order of the repeating units parenthesized by subscripts a, a', a", a''', a'''', a''''', b and b' occurring in the above formula is not limited to that shown; w=1 or 2 depending on the valence of X Or the M2 material can be selected among fluorinated silanes like those responding to the formulae:

(E)

and

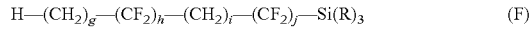

(F)

wherein each of c, d, e, f, g, h, l, j is an integer from 0 to 10, at least one of c, d, e and f is different from 0, at least one of g, h, i and j is different from 0, and R is a hydrolysable group such as has been above defined, or is OH or NH$_2$. Preferably 5≤c+d+e+f≤15 and 5≤g+h+i+j≤15; and more preferably 5≤c+d+e+f≤12 and 5≤g+h+i+j≤12.

Compositions comprising M1 materials are generally a mixture of compounds resulting from the condensation of distinct fragments, wherein the molecules responding to the above disclosed structures are found to be the most important compounds as compared to the rest of the composition. Preferably compositions comprising the M1 material comprise at least 30% (weight/weight of dry matter) of M1 materials, more preferably at least 40%, even more preferably at least 50%, most preferably at least 60% and advantageously at least 70%.

Such compositions can further comprise compounds deprived of the silane group comprising at least one hydrolysable group (such as —NH$_2$ group) or OH group bonded to the silicon atom. Preferably, such compounds are limited in the M1 or M2 compositions to less than 30% (weight/weight of dry matter), even more preferably less than 25%, most preferably less than 20% and advantageously less than 15%.

Such characteristics contribute to the obtaining of very high quality anti-fouling coatings.

The M1 layer of the optical article is an anti-fouling top coat. This anti-fouling surface coating reduces the surface energy of the optical article.

Generally, the hydrophobic and/or oleophobic deposit M1 has a thickness lower than 100 nm, preferably lower than 30 nm, preferably ranging from 1 to 20 nm, more preferably ranging from 1 to 10 nm.

According to the invention the hydrophobic and/or oleophobic deposit M1+M2 has a thickness lower than 20 nm, preferably ranging from 1 to 15 nm, more preferably ranging from 1 to 10 nm.

Thickness values must be understood as physical thicknesses values which can be measured by ellipsometry.

Commercial compositions of M1 materials are the composition OPTOOL DSX™ (a fluorine-based resin comprising perfluoropropylene moieties) commercialized by Daikin Industries, the composition AES4 commercialized by Daikin Industries, the compositions KY130™ commercialized by Shinetsu. OPTOOL DSX™ is the most preferred coating composition for the M1 material.

Commercial compositions of M2 materials are the compositions OF110™, a fluoro alkyl silane or OF210™ commercialized by Optron, or Gelest 1 (a bis(2-hydroxyethyl)-3-aminopropyltriethoxysilane commercialized by Gelest.

The method according to the invention further comprises exposing the face of the substrate resulting from the exposition to M2 to a metal fluoride M3 in a chamber under conditions resulting in the deposit of a layer of this material.

The method according to the invention optionally comprises exposing the face of the substrate resulting from the exposition to M3 to a non fluorinated metal oxide or metal hydroxide M4 in a chamber under conditions resulting in the deposit of a layer of this material.

Generally, the anti-reflection, hydrophobic and/or oil-repellent coatings and the temporary coatings are applied by evaporation, in vacuum machines, which makes it possible to carry out all the operations successively, with no unduly handling with the glasses between two steps.

Advantageously, the materials M1 to M4 are deposited on the surface of the substrate sequentially, and following the order M1, then M2, then M3, then optionally M4.

At each step of the method of the invention, the substrate is exposed to the materials of the first to the third and optionally the fourth materials.

Preferably the materials are evaporated by heating under vacuum.

The temperature of each of the materials of the first to third and optionally fourth deposits should be at a temperature appropriate for their vaporization and deposit on the substrate.

The duration of the exposition is calculated in order to obtain a controlled thickness of the layer. However, the thickness layer values that are given for each of the layers as indications are values, corresponding to a programmed time of exposure and a speed of deposit.

After deposit of materials M1 and M2 on the surface of the substrate, this one is submitted to the application of a temporary layer that increases its surface energy. The deposit of a layer of a metal fluoride, or a mixture of metal fluorides, M3 has been disclosed in document WO02/092524.

Examples of fluorides can include magnesium fluoride $MgF_2$, lanthanum fluoride $LaF_3$, aluminium fluoride $AlF_3$ or cerium fluoride $CeF_3$, or a mixture of those materials. Preferably, M3 is based on $MgF_2$.

A particularly recommended commercially available material is the PAS02 from Leybold Corporation.

The deposit of a layer of a non fluorinated metal oxide or metal hydroxide M4 has been disclosed in document WO2004/110946.

Preferably, the method comprises a treatment step consisting in depositing at least one non fluorinated metallic oxide and/or of at least one non fluorinated metallic hydroxide on the temporary protective layer through vacuum evaporation thereof directly on the temporary protective layer.

Preferably, the metallic oxide is selected amongst calcium or magnesium oxide, silicium oxide, praseodymium oxide, cerium oxide or a mixture of two or more such oxides.

Preferably, the metallic hydroxide is the magnesium hydroxide.

The temporary layers M3/M4 may be applied with any conventional appropriate method, preferably, in vapour phase.

According to a preferred embodiment, M4 is MgO. Preferably, the method includes depositing the temporary layer through vacuum evaporation, the formed M4 layer having a thickness ranging from 1 to 5 nm.

The evaporated MgO can result, for example, from evaporation from:

MgO granules, with a granulometry ranging from 1 to 3 mm (ref.: M-1131 from CERAC);

MgO granules, with a granulometry ranging from 3 to 6 mm (ref.: M-2013 from UMICORE);

MgO pellets, (ref.: 0481263 commercialized by UMICORE corporation).

When $Mg(OH)_2$ is evaporated, it can be advantageously obtained from ALDRICH.

Generally, MgO depositing occurs after the $MgF_2$ deposit. Thus, two distinct layers are achieved. This can be, if necessary, followed with part of the $MgF_2$ evaporation, starting with the MgO evaporation, so that there is then a gradient, the composition of which varies from pure $MgF_2$ to pure MgO at the surface.

Finally, as previously stated, the specific treating step can also consist in slowing down the $MgF_2$ temporary protective layer on the external layer. Usually, such a type of deposit is performed at a speed of about 0.5 nm/s. According to the invention, depositing the protective layer through vacuum evaporation is performed at a speed lower than 0.5 nm/s, preferably about 0.1 nm/s.

As previously indicated, the lenses treated with the method according to the invention comprise two main sides, one of which comprises an external layer coated with a temporary $MgF_2$ protective layer.

According to a preferred embodiment, the two main sides comprise an external layer coated with a $MgF_2$ temporary layer. Generally, the first side on which the various layers are deposited is the concave side.

The $MgF_2$ layer then makes it possible to protect such a side while the second side is being treated.

When both main sides comprise an external layer covered with a $MgF_2$ protective layer, the specific treating step according to the invention is preferably carried out on each of the main sides.

When it is made of a mineral material, the temporary layer M3 thickness is preferably lower than 50 nm, and generally ranges from 1 to 50 nm and more preferably ranges from 5 to 50 nm.

Preferably, the deposit of the M3 temporary layer on the substrate is performed through vacuum evaporation at a speed lower than 0.5 nm/s, preferably lower than or equal to 0.3 nm/s.

Generally speaking, if the temporary layer thickness is too low, there is the risk that the surface energy will be insufficiently modified. If, on the other hand, the temporary layer thickness is too high, more particularly for essentially mineral layers, the inventors have found out that mechanical stresses were likely to occur within the layer, which can be deleterious for the expected properties. Preferably, and more particularly when the temporary protective layer is applied wholly on one of the glass faces, the material shows some degree of transparency allowing to carry out on the glass conventional power measurements with a front-focimeter. Thus, the glass appropriate for trimming according to the invention preferably shows a transmission of at least 18%, more preferably at least 40% according to the ISO8980/3 standard.

As an alternative to the above-mentioned materials of mineral nature, organic material and especially polymeric material can be used instead of using M4 materials, such as those described in WO03057641. In such a case, much higher thickness can be coated than is the case wherein the temporary layer is composed of purely mineral materials. The required thickness can then range from 5 to 150 microns. Alkyd type resins are particularly recommended.

After deposition of materials M1 to M4 on the surface of the substrate, this one is submitted to operations of machining, which include, in a known manner, at least a fixing step and a grinding step. Such steps have been disclosed in detail in WO2007/071700, FR 2824821 and FR 2856056.

An adhesive preformed film can be applied on the surface of the optical article on which M3 and optionally M4 has been deposited.

By preformed film, it is meant a film that has been formed before being applied to the surface of said optical article.

Preferably, the adhesive preformed film is a pressure sensitive adhesive film, and more preferably the preformed film comprises cellulose triacetate.

The glass, and especially the ophthalmic lens, appropriate for trimming according to the method of the invention can be subjected to a wholly conventional trimming operation, except that, in a final step, the temporary protective layer should be removed, simply by wiping off and/or rinsing as is explained here-under, so that the final uppermost layer is the anti-fouling topcoat resulting from the application of the M1 and the M2 materials.

Thus, the invention also relates to a method for obtaining a trimmed glass having a hydrophobic and/or oil-repellent surface property, characterized in that it comprises the steps of:

1) manufacturing a glass, preferably an eyeglass lens, appropriate for trimming according to the invention,
2) holding said glass by an acorn element,
3) trimming said glass,
4) removing the acorn element from said glass,
5) recovering the thus trimmed glass, and
6) removing the M3 and optionally M4 temporary layer so as to restore the glass in its hydrophobic and/or oil-repellent surface properties.

As indicated hereabove, the proper trimming step 3) is conventional and is known to the man of the art. It will consequently not be described in full detail.

The temporary layer removing step may be carried out either in a liquid medium or by dry wiping or by a successive application of both methods. The temporary layer removal may also be enhanced by a mechanical action, preferably through using ultrasounds. At the end of the temporary layer removal step, the glass shows optical and surface features of the same order, even quasi identical to those of the initial glass, comprising the hydrophobic and/or oil-repellent coating.

The temporary layer of organic material is deposited onto the outermost layer of the optical article. Thus, the temporarily protected surface of the optical article is rendered apt to edging since it exhibits an increased affinity toward the surface of the holding pad.

The method of the invention advantageously results in optical articles coated with an outermost layer, after wiping off the temporary layer, having a surface energy lower than or equal to 14 mJoules/$m^2$, more preferably lower than or equal to 13 mJ/$m^2$ and even more preferably lower than or equal to 12 mJ/$m^2$ (the surface energies being calculated according to the Owens-Wendt method disclosed in the following reference: "Estimation of the surface force energy of polymers" Owens, D. K.; Wendt R. G. *J. Appl. Polym. Sci.* 1969, 13, 1741-1747).

It is preferred that the temporary layer formed on the outermost surface of the optical article imparts to said optical article a surface energy sufficient for retaining purposes, i.e., a surface energy at least equal to 12 mJ/$m^2$, preferably at least equal to 15 mJ/$m^2$, more preferably 20 mJ/$m^2$. Obviously, if there is more than one temporary layer, the former surface energy is the surface energy of the external layer of the temporary coating.

EXPERIMENTAL

1—Material and Methods

Lenses:

Organic lenses were prepared, bearing anti-abrasion and anti-reflection coatings that are coated in said order on the substrate. The deposits were achieved on substrates which are polycarbonate ophthalmic lenses comprising, on both sides, an anti-abrasion coating of the polysiloxane type corresponding to example 3 in the Patent Application EP 614957 in the Applicant's name. The AR stack applied on the anti-abrasion coating is the following $ZrO_2$ (27 nm)/$SiO_2$ (21 nm)/$ZrO_2$ (80 nm)/$SiO_2$ (81 nm). The treated lenses were round 65 mm diameter lenses.

Deposit of the Layers:

The vacuum treating machine used is a BAK760 from Balzer machine provided with an electron gun, an ion gun of the Mark2 Commonwealth type and an evaporation source with a Joule effect.

The lenses are placed on a carrousel provided with circular openings intended to accommodate the lenses to be treated, the concave side facing the evaporation sources and the ion gun. A vacuum drawing is performed until a secondary vacuum is reached. Then, a successive evaporation of the materials is performed, with the electron gun or by Joule effect, in the conditions detailed here-under:

Deposit M1:

A layer of OPTOOL DSX™, or AES4™ both commercialized by Daikin Industries is deposited in the following conditions.

A given amount of OPTOOL DSX™ or AES4™ is placed in a copper capsule with a 18 mm diameter, in turn placed in a joule effect crucible (tantalum crucible). A 1 to 5 nm thickness of hydrophobic and oleophobic coating is deposited through evaporation. Setting the deposited thickness is performed by means of a quartz scale.

Deposit M2:

A layer of OF110™ or OF210™ commercialized by Optron, or Gelest 1 commercialized by Gelest is deposited in the same conditions as the Optool DSX™ or AES4™. (hereafter designated by "by boat") or by electron beam evaporation (e-beam))

Deposit of the Temporary Protective Layer:

Deposit M3:

The protective layer is then evaporated. The deposited material is a compound with $MgF_2$ formula, having a 1 to 2.5 nm granulometry, sold by Merck corporation. The evaporation is performed using an electron gun. The deposited physical thickness is 20 nm, with a deposit speed equal to 0.52 nm/s. Setting the deposited thickness is performed by means of a quartz scale. Subsequently, the enclosure is heated again and the treatment chamber is set back to atmosphere. The lenses are then turned upside down and the convex side oriented towards the treatment area. The convex side is treated by $MgF_2$ identically to the concave side (reproducing the steps hereabove).

Deposit M4:

The lenses are then subjected to a specific treatment step by MgO evaporation directly on the temporary $MgF_2$ layer, using an electron gun, a MgO layer is vacuum evaporated (from MgO chips (reference 0481263) from UMICORE corporation) with a 2 nm thickness, directly on the MgF2 protective layer.

Surface Preparation Procedure:

The sequence of operations was the following:

The temporary layers were removed with isopropyl alcohol and a Selvyt cloth.

Then the lens was conditioned (surface preparation), i.e. submitted to wiping with a wet CEMOI™ cloth (impregnated with water) on which is applied a 3 kg weight for 60 cycles (1 cycle=1 back and forth) for 45 s.

A dry Cemoi™ cloth was then used to wipe the lens and the lens was air blown.

After 5 min of waiting, the lens was tested.

Tests:

Measurement of advancing angle, receding angle, hysteresis and table angle.

Advancing and receding contact angle and hysteresis are measured according to the tilting plate method which captures the contact angles measurements on both the left and right sides of a sessile drop while the solid surface is being inclined typically from 0° to 90°.up to the roll off of the drop.

As the surface is inclined, gravity causes the contact angle on the downhill side to increase while the contact angle on the uphill side decreases.

The last valid readings are captured and normally represent the advancing and receding contact angles.

Respectively, these contact angles are referred to advancing and receding angles. The difference between them is the contact angle hysteresis.

More specifically, the test consists in depositing a 25 microliters drop on a lens positioned on a platform. The platform is then tilted at a constant speed so that the lens is positioned at different angles. After the drop starts moving, the first measurement is taken.

The measurement consists of the advancing angle (the front of the drop), the receding angle (back of the drop), the hysteresis (the difference between front and back) and the angle of the platform.

2—Examples

Several lenses were treated with a distinct succession of layers M1, M2, M3 and M4. Reference example 1 does not include the treatment with the M2 layer. The lenses were then submitted to the surface preparation procedure and tested.

The composition and thickness of those layers is given in the following tables to 6. In the examples, thicknesses are real physical thicknesses that can be measured by ellipsometry.

The materials are deposited in the order mentioned in each table, the first cited material being the first deposited on the substrate.

Comparative Example 1

Reference

| Product | Thickness |
| --- | --- |
| AES4 ™ | 15 nm |
| MgF2 | 20 nm |
| MgO | 2 nm |

After Surface Preparation

The average Advancing angle was 115°
The average receding angle was 96°.
The average hysteresis was 19°
The table angle at a speed between was 15.4°

Example 1

| Product | Thickness |
| --- | --- |
| AES4 ™ | 5-7 nm |
| OF110 ™ (boat) | 2-4 nm |
| MgF2 | 20 nm |
| MgO | 2 nm |

After Surface Preparation

The average Advancing angle was 120°
The average receding angle was 109°.
The average hysteresis was 11°
The table angle was 7°

Example 2

| Product | Thickness |
| --- | --- |
| AES4 ™ | 5-7 nm |
| OF110 ™(boat) | 2-4 nm |
| MgF2 | 20 nm |
| SiO2 | 2 nm |

After Surface Preparation

The average Advancing angle was 121°
The average receding angle was 110°.
The average hysteresis was 11°
The table angle was 6°

Example 3

| Product | Thickness |
| --- | --- |
| AES4 ™ | 5-7 nm |
| OF110 ™ (Ebeam) | 5-7 nm |
| MgF2 | 20 nm |
| MgO | 2 nm |

After Surface Preparation

The average Advancing angle was 119°
The average receding angle was 112°.
The average hysteresis at a speed between was 7°
The table angle was 8°

Example 4

| Product | Thickness |
| --- | --- |
| AES4 ™ | 5-7 nm |
| Gelest1 (boat) | 2 nm |
| MgF2 | 20 nm |
| MgO | 2 nm |

After Surface Preparation

The average Advancing was 121°
The average receding angle was 109°.
The average hysteresis was 12°
The table angle was 9°

Example 5

| Product | Thickness |
| --- | --- |
| AES4 ™ | 5-7 nm |
| OF210 ™ (Ebeam) | 5-7 nm |
| MgF2 | 20 nm |
| MgO | 2 nm |

After Surface Preparation
The average Advancing angle was 121°
The average receding angle was °111°.
The average hysteresis between was 10°
The table angle was 10°.

Example 6

| Product | Thickness |
| --- | --- |
| DSX ™ | 10-12 nm |
| OF210 ™(ebeam) | 5-7 nm |
| MgF2 | 20 nm |
| MgO | 2 nm |

After Surface Preparation
The average Advancing angle was 121°
The average receding angle was 104°.
The average hysteresis was 17°
The table angle was 15°

Example 7

| Product | Thickness |
| --- | --- |
| HDTC | 7-9 nm |
| OF210 ™ (ebeam) | 5-7 nm |
| MgF2 | 20 nm |
| MgO | 2 nm |

After Surface Preparation
The average Advancing angle was 121°
The average receding angle was 116°.
The average hysteresis was 5°
The table angle was 7°

Example 8

| Product | Thickness |
| --- | --- |
| HDTC | 5-7 nm |
| OF210 ™(ebeam) | 5-7 nm |
| MgF2 | 20 nm |
| MgO | 2 nm |

After Surface Preparation
The average Advancing angle was 122°
The average receding angle was 114°.
The average was 8°
The table angle was 7°

Comparative Example 2

Reference

| Product | Thickness |
| --- | --- |
| HDTC | 7-9 nm |
| MgF2 | 20 nm |
| MgO | 2 nm |

After Surface Preparation
The average Advancing angle was 120°
The average receding angle was °112°.
The average hysteresis was 8°
The table angle was 12°

3—Discussion

From the results disclosed above, it can be observed that the deposition of the M2 material between the M1 topcoat layer and the temporary adhesion improving layer M3/M4, of a material comprising a silane function which is capable of reacting with the OH functions of the substrate, and a hydrophobic group of small size, significantly improves the hydrophobicity and oleophoby of the treated substrate.

Examples 9 and 10

Preparation of Lenses According to the Invention Comprising an Adhesive Preformed Film A polycarbonate lens −8.00 cylinder+2.00 from Essilor coated with a hard coat and an antireflective coating was submitted to the deposition of the following

Example 9

DSX™+OF110™+MgF2/MgO+Film

| Product | Thickness |
| --- | --- |
| DSX ™ | 10-12 nm |
| OF110 ™ (boat) | 5-7 nm |
| MgF2 | 20 nm |
| MgO | 2 nm |

A TAC-PSA (FujiTAC film 80 μm/Nitto Denko CS-9261 (acrylic PSA)) film of a dimension 30 mm×30 mm was placed in the middle of the lens.

The lenses were first edged 1 week after coating and film application. The procedure consists of marking the lens so that the cylinder is placed at 90°. The lenses were blocked with a 24 mm pad and blocker, and then edged to a specific shape (Charmont) using a Triumph grinding wheel edger. After edging, they are placed in the holder and the cylinder axis is measured again. If the cylinder is at 90±2° then minimum risk is considered in the edging. If it is at more than 3° but less than 5° then some risk are possible. If it is more than 5°, then there is high risk of rotation during edging. For 5 lenses tested, all were within 2° of the desired axis with an average axis value of 89.6° Another set of lenses were kept in an environmental chamber for 1 month at a temperature of 40° and 80% humidity. The lenses were edged the same manner. The average for 5 lenses was 90°.

Example 10

HDTC+OF110™+MgF2/MgO Film

| Product | Thickness |
|---|---|
| HDTC | 7-9 nm |
| OF110 (boat) | 5-7 nm |
| MgF2 | 20 nm |
| MgO | 2 nm |

TAC-PSA film of a dimension 30 mm×30 mm was placed in the middle of the lens. The lenses were first edged 1 week after coating and film application using the above procedure. The cylinder was measured after edging. For 5 lenses tested, all were within 2° of the desired axis with an average axis value of 89.2°

The invention claimed is:

1. A method for the manufacture of an optical article comprising:
    providing a substrate having two main faces and bearing —OH functions on at least one of the faces; and
    exposing successively in this order at least one face of the substrate bearing —OH functions to at least 3 distinct materials defined as M1, M2, M3, and optionally a material M4, in a vacuum chamber under conditions resulting in the deposit of those materials on the surface of the substrate wherein:
    M1 is a substituted silane comprising:
        at least one function X1 directly bonded to a Si atom of the substituted silane, wherein the Si—X1 group is capable of forming a covalent bond with a OH group of the substrate; and
        at least one fluorine containing group,
    M2 is a substituted silane of number average molecular weight less than or equal to 900 g/mol comprising:
        at least one function X2 directly bonded to a silicon atom of said substituted silane wherein the Si—X2 group is capable of forming a covalent bond with a —OH group of the substrate and/or a covalent bond with M1; and
        at least one hydrophobic or oleophobic group, or at least one hydrophilic group; and
    M3 is a metal fluoride;
wherein M1 has a weight average molecular weight higher than M2 and the difference between M1 and M2 weight average molecular weights is equal to or higher than 600 g/mol.

2. The method of claim 1, wherein X1 is a hydrolysable group, a —NH$_2$ group, or a —OH group directly bonded to the silicon atom and X2 is a hydrolysable group, a —NH$_2$ group, or a —OH group.

3. The method of claim 1, wherein the difference between M1 and M2 weight average molecular weights is equal to or higher than 900 g/mol.

4. The method of claim 1, comprising deposition of a material M4, wherein M4 is a non-fluorinated metal oxide or metal hydroxide.

5. The method of claim 1, wherein conditions for formation of a layer include evaporation under vacuum.

6. The method of claim 1, wherein X1 and X2 are independently a halogen atom, a —NH-alkyl group, a dialkylamino group, an alkoxy group, an acyloxy group, an isocyanate group, a —OH group, or a —NH$_2$ group.

7. The method of claim 1, wherein the fluorine containing group results from assembly of a divalent fluoroalkyl group, fluoroalkenyl group, poly(fluoro alkyl ether) group, alkyl group, and/or alkenyl group.

8. The method of claim 1, wherein the number average molecular weight of M1 is equal to or higher than 2000 g/mol.

9. The method of claim 8, wherein the number average molecular weight of M1 ranges from 3000 g/mol to 6000 g/mol.

10. The method of claim 1, wherein M1 is a compound of the following formulae:

$$R_F-(OCF_2CF_2CF_2)_a-(OCFCF_2)_b-(OCF_2)_c-$$
$$\overset{|}{CF_3}$$

$$-(OCF_2CF_2)_d-OCF-(CF_2)_e-\left(CH_2-\underset{(CH_2)_l}{\overset{Y}{\underset{|}{C}}}-\underset{Si-(R^1)_m}{\underset{|}{\underset{(R^2)_{3-m}}{|}}}\right)_{n''}-X$$
$$\overset{|}{Z}$$

wherein:
    R$_F$ is a perfluoroalkyl group;
    Z is a fluorine atom or a trifluoromethyl group;
    a, b, c, d and e each independently are 0 or an integer equal to or higher than 1 provided that a+b+c+d+e is not less than 1, and order of the repeating units parenthesized by subscripts a, b, c, d and e occurring in the above formula is not limited to that shown;
    Y is a hydrogen atom or an alkyl group containing 1 to 4 carbon atoms;
    X is a hydrogen, bromine; or iodine atom;
    R$^1$ is a hydroxyl group, a NH$_2$ group or a hydrolyzable substituent group;
    R$^2$ is a hydrogen atom or a monovalent hydrocarbon group;
    l is 0, 1 or 2;
    m represents 1, 2 or 3; and
    n" is an integer equal to or higher than 1.

11. The method of claim 10, wherein n" is an integer equal to or higher than 2.

12. The method of claim 1, wherein M1 is a compound of General Formula (A) or General Formula (B) and (C):

$$F-(CF_2)_q-(OC_3F_6)_m-(OC_2F_4)_n-(OCF_2)_o- \\ (CH_2)_p-X(CH_2)_r-Si(X)_{3-a}(R1)_a \quad (A)$$

$$F-(CF_2)_q-(OC_3F_6)_m-(OC_2F_4)_n-(OCF_2)_o \\ (CH_2)_pX(CH_2)_r-Si(X')_{1-a}(R1)_aO-[(CF_2)_q- \\ (OC_3F_6)_m-(OC_2F_4)_n-(OCF_2)_o(CH_2)_p \\ X(CH_2)_rSi(F)(X')_{1-a}(R1)_aO]_z-(CF_2)_q- \\ (OC_3F_6)_m-(OC_2F_4)_n-(OCF_2)_o(CH_2)_p \\ X(CH_2)_rSi(F)(X')_{2-a}(R1)_a \quad (B)$$

$$F-(CF_2)_q-(OC_3F_6)_m-(OC_2F_4)_n-(OCF_2)_o- \\ (CH_2)_p-X(CH_2)_r-(CH_2)_t-Si(X')_{3-a}(R1)_a \quad (C);$$

wherein:
    q is an integer from 1 to 3;
    m, n, and o are independently integers from 0 to 200;
    p is 1 or 2;
    X is O or a bivalent organic group;
    r is an integer from 2 to 20;
    t is an integer from 1 to 10;

R1 is a C1-22 linear or branched hydrocarbon group;
a is an integer from 0 to 2;
X' is a hydrolysable group, an —OH group or a —NH$_2$ group; and
z is an integer from 0 to 10 when a is 0 or 1.

13. The method of claim 1, wherein the number average molecular weight of M2 is less than or equal to 800 g/mol.

14. The method of claim 1, wherein M2 is a non-fluorinated or fluorinated silane of formula:

$$[H-(OCH_2-CH_2)_a-(OCH_2-CH_2-CH_2)_{a'}-(OCF_2-CF_2)_{a''}-(OCF_2-CF_2-CF_2)_{a'''}-(OCHF-CHF)_{a''''}-(OCHF-CHF-CHF)_{a'''''}]_w X-(CH_2)_b-(CF_2)_{b'}-Si(R)_3 \quad (D)$$

wherein:
  a, a', a'', a''', a'''', a''''' are integers from 0 to 2;
  a+a'+a''+a'''+a''''+a''''' is at least one;
  X is O or N or NH;
  b and b' are integers from 0 to 10 and b+b' cannot be less than 1;
  R is a hydrolysable group such as defined above or is OH or NH$_2$;
  order of the repeating units parenthesized by subscripts a, a', a'', a''', a'''', a''''', b and b' occurring in the above formula is not limited to that shown; and
  w=1 or 2 depending on the valence of X;

$$F-(CF_2)_c-(CH_2)_d-(CF_2)_e-(CH_2)_f-Si(R)_3 \quad (E); \text{ or}$$

$$H-(CH_2)_g-(CF_2)_h-(CH_2)_i-(CF_2)_j-Si(R)_3 \quad (F).$$

wherein:
  each of c, d, e, f, g, h, i, j is an integer from 0 to 10;
  at least one of c, d, e and f is not 0;
  at least one of g, h, i and j is not 0; and
  R is a hydrolysable group as defined above, OH, or NH$_2$.

15. The method of claim 1, wherein the M1 deposit has a thickness of less than 30 nm.

16. The method of claim 15, wherein the M1 deposit has a thickness ranging from 1 to 10 nm.

17. The method of claim 1, wherein the M1+M2 deposit has a thickness of less than 20 nm.

18. The method of claim 1, comprising applying an adhesive preformed film on the surface of the optical article on which M3, or M3 and a material M4 has been deposited.

19. The method of claim 18, wherein the preformed film is a pressure sensitive adhesive film.

20. An optical article obtained by the method of claim 1.

21. The optical article of claim 20, further defined as having a surface energy at least equal to 15 mJ/m$^2$.

22. A method for obtaining a trimmed optical article having a hydrophobic and/or oil-repellent surface property, comprising:
  manufacturing an optical article appropriate for trimming using the method of claim 1;
  optionally applying an adhesive preformed film on the surface of the optical article;
  holding said optical article with an acorn element;
  trimming said optical article;
  removing the acorn element from said optical article;
  recovering a trimmed optical article; and
  removing a preformed film, if present, the M3 layer and a M4 layer, if present.

* * * * *

UNITED STATES PATENT AND TRADEMARK OFFICE
CERTIFICATE OF CORRECTION

PATENT NO. : 9,637,643 B2
APPLICATION NO. : 14/758158
DATED : May 2, 2017
INVENTOR(S) : Gerald Fournand It is certified that error appears in the above-identified patent and that said Letters Patent is hereby corrected as shown below:

In the Claims

Claim 12, Column 22, Line 52:
Delete "$(CH_2)_p-X(CH_2)_r- Si(X)_{3-a}(R1)_a$" and replace with -- $(CH_2)_p-X(CH_2)_r- Si(X')_{3-a}(R1)_a$ --.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*